Oct. 5, 1965  R. L. HOLLOWAY  3,209,848
AIR CUSHION VEHICLE
Filed July 19, 1961  4 Sheets-Sheet 2
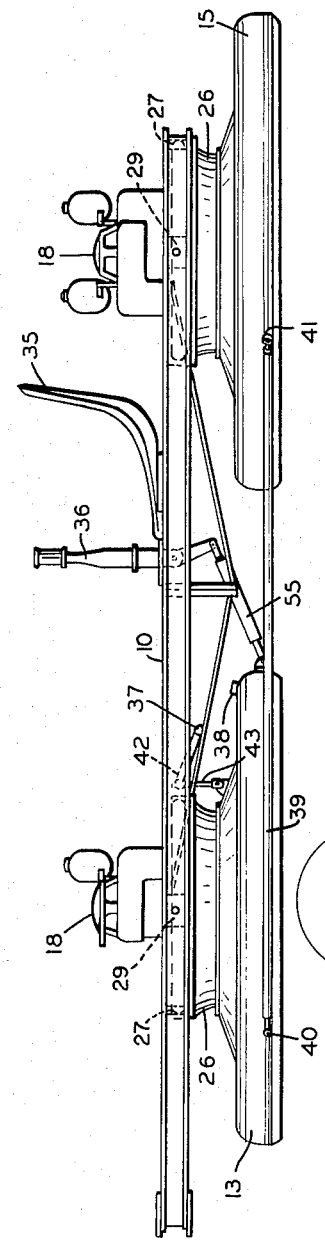
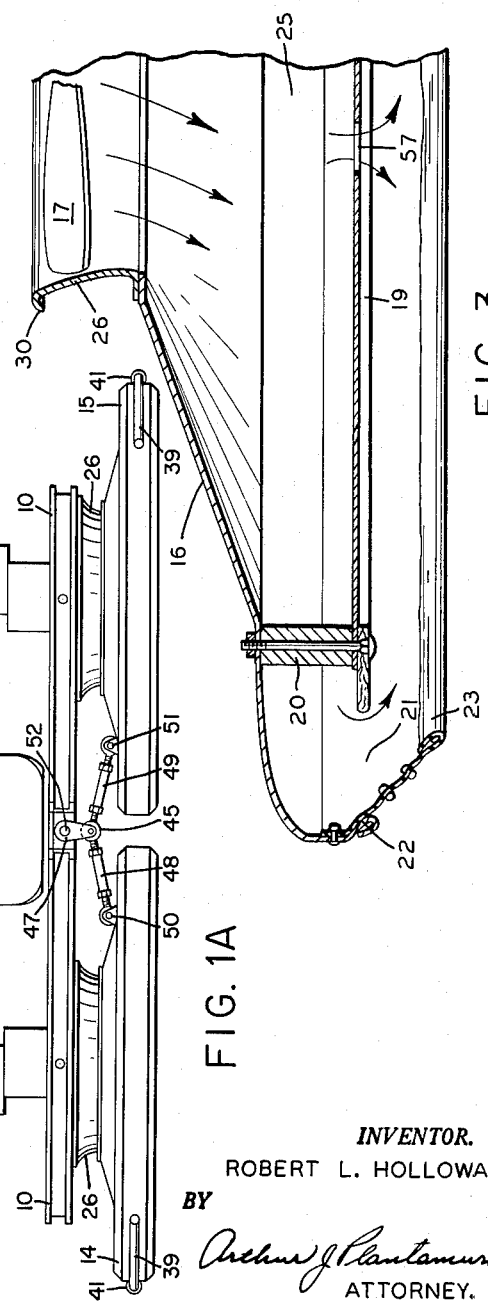
INVENTOR.
ROBERT L. HOLLOWAY
BY
Arthur J. Plantamura
ATTORNEY.

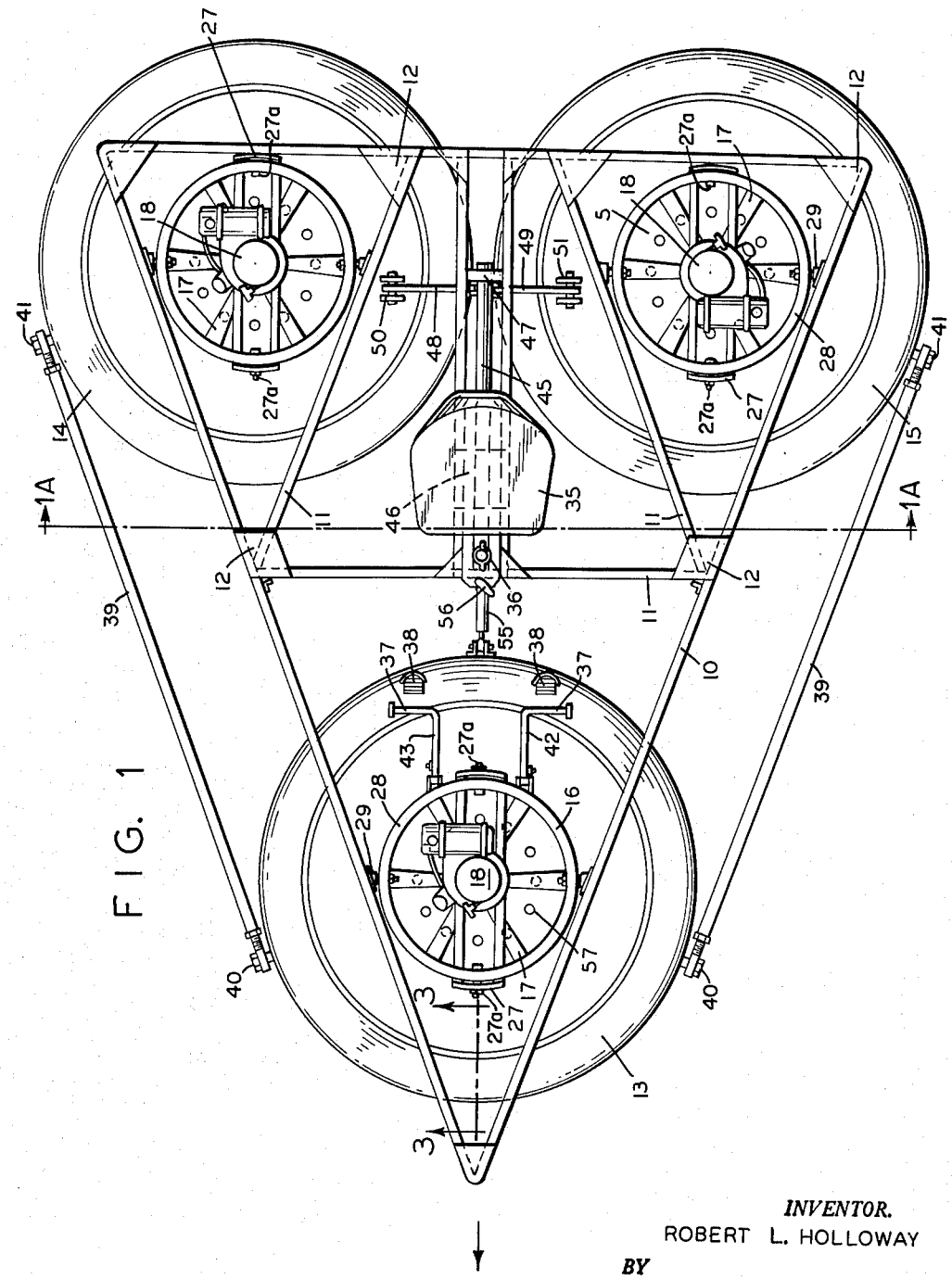

Oct. 5, 1965  R. L. HOLLOWAY  3,209,848
AIR CUSHION VEHICLE
Filed July 19, 1961  4 Sheets-Sheet 3

INVENTOR.
ROBERT L. HOLLOWAY
BY
Arthur J. Plantamura
ATTORNEY.

Oct. 5, 1965    R. L. HOLLOWAY    3,209,848
AIR CUSHION VEHICLE
Filed July 19, 1961    4 Sheets-Sheet 4

INVENTOR.
ROBERT L. HOLLOWAY
BY
Arthur J. Plantamura
ATTORNEY.

United States Patent Office 3,209,848
Patented Oct. 5, 1965

3,209,848
AIR CUSHION VEHICLE
Robert L. Holloway, Snyder, N.Y., assignor to American Machine & Foundry Company, a corporation of New Jersey
Filed July 19, 1961, Ser. No. 125,146
9 Claims. (Cl. 180—7)

This invention relates to ground effect machines, and more specifically, to a maneuverable vehicle which is supportable on a cushion of air.

The prior art discloses many crafts under the category of ground effect machines. In general, such vehicles utilize an arrangement whereby sufficient air is pumped downward, generally through the vehicle itself, to maintain not only the quantity of air to sustain the vehicle but to supply enough air to restore that which is exhausted from the bottom periphery of the vehicle.

One of the main advantages of vehicles of this type is the relatively low power requirements. For example, such vehicles are capable of lifting and transporting payloads in excess of 2 or 3 times, or more, of their own weight.

Heretofore, one of the paramount disadvantages of vehicles of this type has been poor maneuverability due to the frictionless movement thereof (supported on the cushion of air) at relatively moderate speeds which render use of air foils to produce turns or counter the effect of crosswinds, etc., relatively ineffective.

It is an object of the present invention to provide an improved air cushion vehicle of moderate cost having exceptionally good control characteristics.

It is a more specific object of the invention to provide an air cushion vehicle comprising a plurality of supporting pods or chambers which are tiltable with respect to the vehicle frame to effect maneuverability of the vehicle.

It is another object of the invention to provide an air cushion vehicle utilizing a plurality of supporting pods which exhaust air as an annular jet and in which the central plate producing the peripheral jet is movable to maneuver and/or assist in maneuvering the vehicle.

Other objects and advantages will become apparent from the accompanying description when considered in conjunction with the accompanying drawings wherein:

FIG. 1 is a plan view of one embodiment of the invention in which three pods are employed to support the vehicle.

FIG. 1A is a transverse elevational view taken substantially along line 1A—1A of FIG. 1.

FIG. 2 is an elevational view of the vehicle shown in FIG. 1.

FIG. 3 is a view partly in section of a part of a single pod which provides air to support the vehicle.

Figure 6:
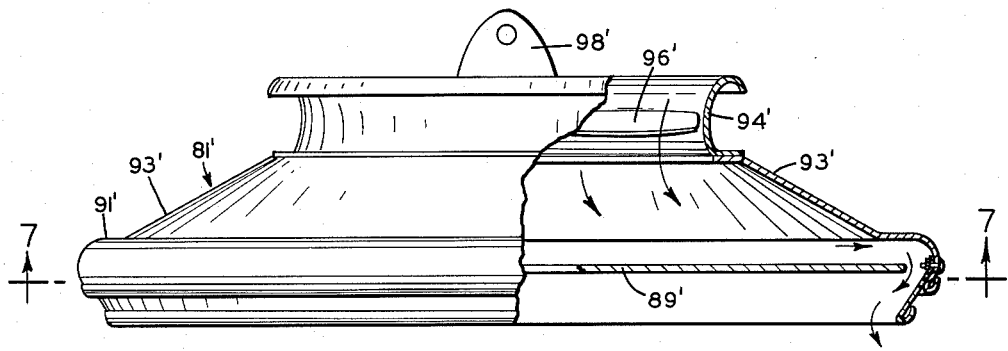
FIG. 6 is still a further alternate showing a pod which has a rectangular plenum chamber in which the center plate forming the annular passage is movable.

FIGS. 7(a), 7(b), 7(c) and 7(d) are taken substantially along the lines 7—7 of FIG. 6 showing different positions of the plate in the plenum chamber.

Referring to FIG. 1 of the drawing, a triangular frame 10 is suitably reinforced with struts 11 and joint plates 12. Mounted substantially at each corner of the triangle is an articulate pod generally referred to as 13, for the forward pod, and as 14 and 15 for the paired rear pods. The pods 13, 14 and 15 are attached to the frame 10 by an arrangement hereinafter described, which permits the pods to be tilted about longitudinal and transverse axes.

The pods comprise a housing 16 in which is suitably mounted a fan 17 and a drive motor 18 for the fan. The housing 16 forms a plenum chamber 25 into which air, drawn in by the fan 17, is pumped. Near the bottom of the pod (see FIG. 3) is affixed a plate 19 suitably attached at 20 to the housing 16 forming the bottom closure of the plenum chamber 25 and is so arranged that air is exhausted at the bottom of the pod through an annular space 21. The housing 16 terminates in a downwardly curved portion 22 at which is affixed an annular flexible fringe or skirt 23. The skirt functions to facilitate passage of the machine over solid obstacles such as stones. The left capabilities or ground clearance attained by the vehicle beyond the flexible fringe is similar to the clearance or height from the ground of a rigid skirt. The housing 16 has an upper outwardly flanged opening 26 which houses the fan 17 and which terminates in a bell-mouth 30. Attached to each pod is a pair of upstanding ears 27 (see FIG. 1) which are pivotally connected at 27a to a gimbal ring 28. The pods tilt along a longitudinal axis with respect to the gimbal ring 28. The gimbal ring 28 is connected by means of the pivoting arrangement 29 permitting the entire pod assembly to tilt along the axis transverse to the forward direction of the vehicle.

Suitably situated upon the frame is a seat 35, a control stick 36 and foot pedals 37. Situated slightly to the rear and below the pedals 37 are heel rests 38. Connecting the pods, so that the tilting action of all three pods along the transverse axis in unison, are the pod synchronizing struts 39 attached in pivoting relationship to the pod 13 at 40 and to the pod 15 at 41. Tilt of the forward pod 13 along a longitudinal axis in the forward direction is effected independently of the two rearward pods 14 and 15. The forward pod is tilted along a longitudinal axis by means of a foot pedal 37 through the connecting links 42 and 43 for the downward left and right movement, respectively. The tilting of the rear pods 14 and 15 along a longitudinal axis is effected by lateral movement of the stick 36 through torque shaft 45 suitably mounted in front bearing 46 and rear bearing 47 (see FIG. 1). The torque shaft 45 is connected by means of a link 52 to the frame 10 and by the linking members 48 and 49 at 50 and 51 to the pods 14 and 15, respectively. The lateral movement of the stick 36 rotates the torque shaft and through the crossed link members 48 and 49 effects simultaneous movement of the rear pods so that movement of the stick 36 to the left will tilt the pods 14 and 15 to the left along a longitudinal axis raising the right side of the pods and a like movement of the stick to the right will produce a tilting movement of the pods along the longitudinal axis to the right. The movement of all pods along the transverse axes is in unison so that a forward movement of the stick 36 will tilt pod 13 so that the rear portion of the pod is raised through the strut 55 (shown more clearly in FIG. 2), thereby expelling increased quantities of air from the rear of the pods. The pod 13 is suitably connected, as mentioned above, to the pods 14 and 15 by a strut 39 so that the tilting of the pods along the transverse axis is effected in unison. Stability of the pods is aided by exhausting a portion of the air through the central plate 19. It is preferred that a plurality of vent holes 57 near the center of the plate be formed in the plate 19 for this purpose.

Suitably mounted adjacent to the control stick 36 is a throttle 56 (shown in FIG. 1) to control the speed of the engines. A single control is shown but it will be apparent that a separate throttle control may be employed for each engine or for two or all three where the effect of controls so arranged is considered desirable. In operation, the motor in each of the pods is started and suitably throttled so as to elevate the vehicle. Maneuvering of the vehicle is produced by use of the control stick 36 and pedals 37. For a straight forward movement, the stick 36 is thrust forward thereby raising the rear of the pods supplying relatively large quantities of air aft. The jet effect of the air expelled will propel the vehicle in a forward direction. In addition to this thrust effect produced by the jet exhaust from the rear of the tilted pod, the horizontal vector component of the lift fan 17 on the intake side of the duct augments the thrust produced by the jet effect. The turning movement may be effected either by using either the pedals 37 alone or in conjunction with the lateral movement of the stick. Use of the pedals alone will produce a slow spinning effect whereas employed in conjunction with the lateral movement of the stick, a drift in that direction is obtained. The pedals and lateral movement of the stick are also utilized to compensate against wind pressure. The vehicle may be stopped by drawing the control stick 36 rearward, thereby lifting the forward position of the pods 13, 14 and 15 spilling larger amounts of air from the front of each pod imparting a reverse thrust to the vehicle. A more rapid stop may be effected by shutting off power to one or more of the lift fans so that the vehicle touches down. When all fans are shut off the vehicle touches down to a rapid but cushioned stop due to residual air contained in the plenum chambers of the pods. Although a separate engine has been illustrated as the driving means for the fan in each pod, it will be apparent that a single source providing the motive power for each of the fans may be utilized. For example, a commercially available flexible coupling drive connecting each fan with a centrally located motor may be used.

Figure 4:
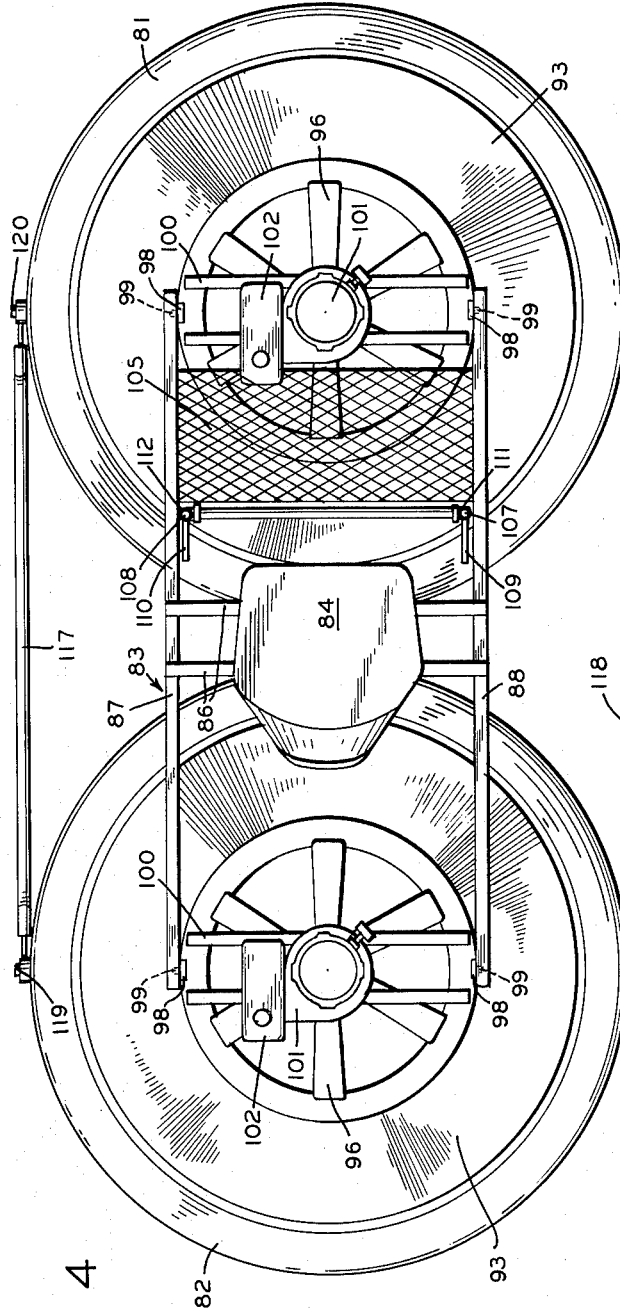
FIG. 4 is an alternate embodiment in which a two pod vehicle is shown.
Figure 5:
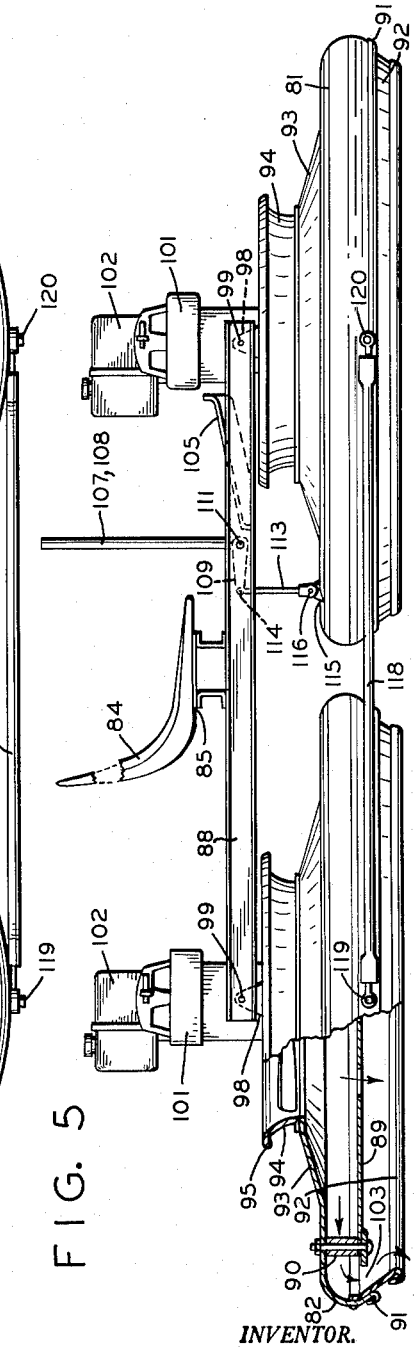
FIG. 5 is an elevational view of the vehicle shown in FIG. 4.

Referring to FIGS. 4 and 5 of the drawings, an alternate air cushion vehicle in which two lifting pods are employed is illustrated. As shown therein, the pods 81 and 82 are connected by a frame 83. The pods are connected so as to be in simultaneous tiltable relationship along axes transverse to the frame. The frame comprises two longitudinal members 87 and 88 upon which an operator's seat 84 may be supported in a convenient manner. As shown, the seat 84 is fastened at 85 to a pair of transverse reinforcing members 86 which are in turn secured to the longitudinal frame members 87 and 88. The pods 81 and 82, similar to 13, 14 and 15 of FIGS. 1–3, comprise a plenum chamber having an inwardly contoured bottom portion 91 which is secured to a flexible fringe 92. Situated in the chamber is a plate 89 suitably secured to the pods by spacer and bolt arrangement 90 so as to form an annular space 103 through which air is exhausted. The pod has a super-structure comprising a frustrum 93 surmounted by a duct section 94 terminating at the uppermost portion in an outwardly flanged structure or bellmouth 95. The propeller 96 is suitably mounted in the pod so as to pump air into the plenum chamber 92 of the pod.

The pods 81 and 82 are suitably attached in tilting relationship with the frame 83 by means of ears 98 formed integrally with, or otherwise securely attached to, the duct portion 94 of the pod by a pivot pin 99. A motor 101 is suitably supported on the pods in a convenient manner such as by supports 100 which are affixed to the duct 94. A fuel container for the motor is shown at 102. The duct openings may be covered wholly or in part by a steel or other metal mesh as a safety measure. As shown, mesh 105 which covers the duct in part is employed as a combination propeller guard and foot rest. Shown at 107 and 108 are the right and left control sticks, respectively. The control sticks actuate the forward pod by cranks 109 and 110, pivoting at points 111 and 112, respectively. Secured to the end 114 of the crank 109 is a link 113 which in turn is fastened at its other end 116 to the forward pod 81 at 115. A similar arrangement connects the crank 110 at the other side of the pod 81. The linking members 117 and 118 link the forward and rear pods by a pivoting connection 119 and 120 so that tilting of the forward and rear pods is effected in unison. In operation, the forward movement of the sticks 107 and 108 tilts the pods so that the rearward portion is elevated. The effect is to expel a large quantity of air at the rear of the pods resulting in producing a forward thrust to the vehicle. The movement of the sticks 107 and 108 aft produces the opposite result, i.e. the forward portion of the pods is elevated resulting in the expulsion of a larger quantity of air in a forward direction producing a reverse thrust. The effect of shifting of the operator's weight to the left or right produces a lateral movement. Likewise, the different stick positions cause the frame to twist, producing a yawing motion to the vehicle when underway; when the right hand stick is pushed forward and the left hand stick to the rear, a motion clockwise results; a reverse movement of the sticks produces motion counterclockwise as viewed from above.

Figure 7:
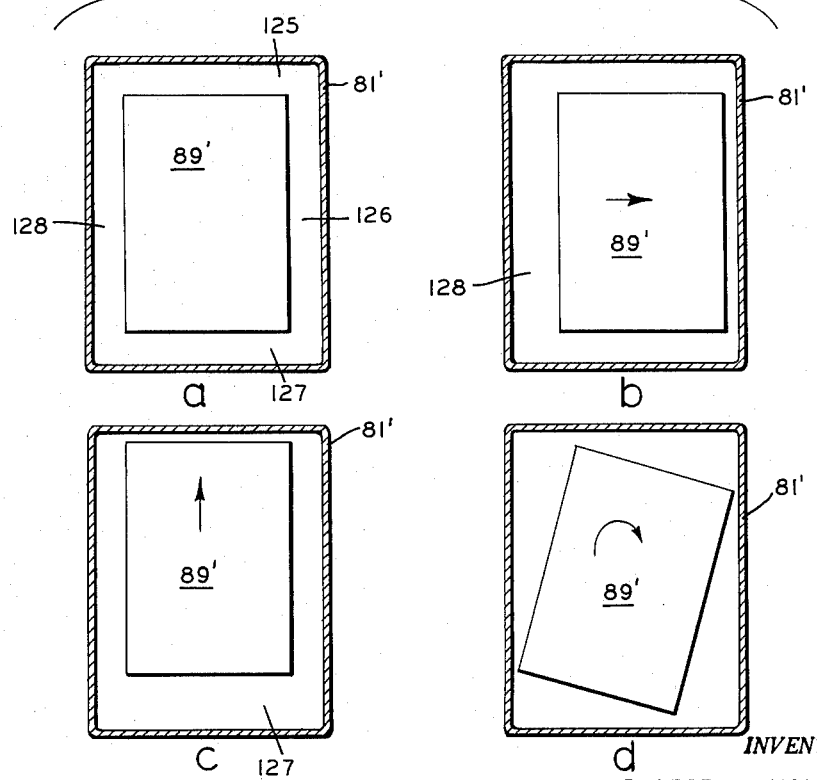

As shown in FIGS. 6 and 7, an alternate means for effecting maneuverability of the vehicle is described. The elements of FIG. 7 are described by the use of primed numbers to facilitate a description with respect to the pods shown in FIGS. 4 and 5.

In FIG. 6, a pod 81' of substantially rectangular design is employed comprising lower contoured portion 91 of the pod 81', a frustrum 93' and a duct 94'. A propeller or fan 96' is suitably mounted in the pod 81'. The supporting ears 98' are for connecting the pod to the frame. The plate 89' is situated within the plenum and is arranged by any suitable arrangement, such as a gearing (not shown), so as to be movable with respect to the pod housing 81'. The movements contemplated are illustrated schematically more clearly in FIGS. 7a through 7d. Shown at FIG. 7a, the plate 89' is centered within the pod 81' so that the annular space on each of the sides 125, 126, 127 and 128 is equal. When it is desired to provide greater thrust at one side of the pod, the plate 89' is shifted transversely of the direction of the vehicle pod 81', so that a larger quantity of air is exhausted 128 resulting in a movement of the pod in a direction shown by the arrow of FIG. 7b. When the plate is moved in a longitudinal direction with respect to the housing as shown in FIG. 7b effecting the expulsion of a larger quantity of air at the lower portion 127 of the pod, it produces a movement of the pod in a direction of the arrow. Likewise, the plate 89' may be rotated with respect to the pod so as to produce a turning movement as a consequence of the expulsion of the larger quantity of the air from the corners of the pod. It will be apparent that the plate may be shifted diagonally to produce the resulting effect of expulsion of larger quantities of air from two sides at once.

As shown in FIG. 7d, when a rotational movement of the pod is desirable, the plate 89' is rotated so that the gap in the annular opening is disportionately larger at the corners of the pod. The effect is to provide greater thrust at the corners producing a turning movement as illustrated by the arrow.

It will be apparent that various modifications may be made in the various details described herein without departing from the ambit of the invention. For example, although vehicles with 2 and 3 lift pods have been illustrated, 4, 5, 6 or more pods may be used in a single vehicle. Also, although pods have been shown operable in coordinate relationship, each pod may be individually operable, if desired. Additionally, it is understood that in addition to ducted fans for generating air into the lifting plenums, various other known means for supplying the necessary air may be utilized. As such, for example, gas turbines commercially available from the General Electric Company of the kind referred to in "Trans-actions of the American Society of Mechanical Engineers," vol. 81, New York, 1959, pages 268, 272, may be adapted.

Various additional modifications may be made in the teaching presented without departing from the scope of the invention. Accordingly, the invention is not to be limited except insofar as necessitated by the appended claims.

I claim:

1. An air cushion vehicle comprising a frame, a plurality of plenum chambers under which the air cushion is formed and from which air is exhausted, said chambers functioning as the vehicle lifting medium and being attached in tiltable relationship to said frame, steering control means for tilting at least one of said plenum chambers with respect to said frame and with respect to the ground over which the vehicle travels to vary the relative proportion in a selected direction of air exhausted from the bottom of said chambers to maneuver said vehicle, and an air generating source to supply air for said chambers to elevate said vehicle sufficiently to allow said plenum chambers to tilt.

2. An air cushion vehicle comprising a frame, a plurality of plenum chambers under which the air cushion is formed and from which air is exhausted, said chambers functioning as the vehicle lifting medium and being attached in tiltable relationship to said frame, steering control means for tilting said plenum chambers with respect to said frame and with respect to the ground over which the vehicle travels to vary the relative proportion in a selected direction of air exhausted from the bottom of said chambers to maneuver said vehicle and an air source introducing air into said plenum chambers to elevate said vehicle sufficiently to allow said plenum chambers to tilt.

3. An air cushion vehicle comprising a frame, a plurality of plenum chambers under which the air cushion is formed, said chambers functioning as the vehicle lifting medium and being attached in tiltable relationship to said frame, steering control means for tilting at least one of said plenum chambers with respect to said frame and with respect to the ground over which the vehicle travels to vary the relative proportion in a selected direction of air exhausted from the bottom of said chambers to maneuver said vehicle, an air generating source comprising a ducted fan for said plenum chambers and means to drive said fans to pump air into said chambers to elevate said vehicle sufficiently to allow said plenum chambers to tilt.

4. An air cushion vehicle comprising a frame, a plurality of plenum chambers under which the air cushion is formed, said chambers functioning as the vehicle lifting medium and being attached in tiltable relationship to said frame, steering control means for tilting said plenum chambers with respect to said frame and with respect to the ground over which the vehicle travels to vary the relative proportion in a selected direction of air exhausted from the bottom of said chambers to maneuver said vehicle, an air generating source comprising a ducted fan for said plenum chambers and means to drive said fan to pump air into said chambers to elevate said vehicle sufficiently to allow said plenum chambers to tilt.

5. An air cushion vehicle according to claim 1 in which air is exhausted from said chambers as an annular jet about a plate positioned in said chambers.

6. An air cushion vehicle according to claim 1 consisting of two plenum chambers.

7. An air cushion vehicle according to claim 1 consisting of three plenum chambers.

8. An air cushion vehicle comprising a frame, vehicle lifting means comprising a forward plenum chamber and two rearward paired plenum chambers attached in tiltable relationship to said frame, steering control means for tilting said plenum chambers in unison along transverse axes with respect to said frame and with respect to the ground over which the vehicle travels and means to tilt the forward chamber independently of said rearward chambers with respect to a longitudinal axis, to vary the relative proportion in a selected direction of air exhausted from the bottom of said chambers to maneuver said vehicle, an air generating source comprising a ducted fan for each plenum chamber and means to drive said fan to pump air into said chamber to elevate said vehicle sufficiently to allow said plenum chambers to tilt.

9. An air cushion vehicle according to claim 3 in which the exhaust periphery of the plenum chambers is substantially rectangular and in which the plate about which air is exhausted is movable laterally and rotationally to controllably alter the flow of air exhausted from said plenum chambers.

References Cited by the Examiner

UNITED STATES PATENTS

| 2,926,868 | 3/60 | Taylor | 244—12 |
| 2,955,780 | 10/60 | Hulbert | 180—7 |
| 2,981,501 | 4/61 | Schaefer | 180—7 |
| 3,097,718 | 7/63 | Jay et al. | 180—7 |
| 3,119,598 | 1/64 | Petersen et al. | 180—7 |

FOREIGN PATENTS

| 1,238,499 | 7/60 | France. |
| 975 | 1914 | Great Britain. |

FERGUS S. MIDDLETON, Primary Examiner.

A. HARRY LEVY, MILTON BUCHLER, Examiners.

Notice of Adverse Decision in Interference

In Interference No. 95,934 involving Patent No. 3,209,848, R. L. Holloway, AIR CUSHION VEHICLE, final judgment adverse to the patentee was rendered Sept. 10, 1968, as to claims 1, 2, 3, 4, 6 and 7.
[*Official Gazette December 17, 1968.*]